US010059279B2

(12) United States Patent
Jodon De Villeroche

(10) Patent No.: US 10,059,279 B2
(45) Date of Patent: Aug. 28, 2018

(54) SUPPORT FOR ATTACHING A PORTABLE DEVICE TO A VEHICLE REAR-VIEW MIRROR

(71) Applicant: Gerard Jodon De Villeroche, Paris (FR)

(72) Inventor: Gerard Jodon De Villeroche, Paris (FR)

(*) Notice: Subject to any disclaimer, the term of this patent is extended or adjusted under 35 U.S.C. 154(b) by 299 days.

(21) Appl. No.: 15/101,790

(22) PCT Filed: Oct. 27, 2014

(86) PCT No.: PCT/EP2014/072992
§ 371 (c)(1),
(2) Date: Jun. 3, 2016

(87) PCT Pub. No.: WO2015/082132
PCT Pub. Date: Jun. 11, 2015

(65) Prior Publication Data
US 2016/0362067 A1 Dec. 15, 2016

(30) Foreign Application Priority Data

Dec. 3, 2013 (FR) ..................................... 13 02810

(51) Int. Cl.
B60R 1/04 (2006.01)
B60R 11/02 (2006.01)
(Continued)

(52) U.S. Cl.
CPC ............ B60R 11/0241 (2013.01); B60R 1/04 (2013.01); B60R 11/0258 (2013.01);
(Continued)

(58) Field of Classification Search
CPC ..... B60R 2011/0033; B60R 2011/0059; B60R 11/0258; B60R 11/0241; B60R 11/02;
(Continued)

(56) References Cited

U.S. PATENT DOCUMENTS 6,418,010 B1 7/2002 Sawyer
6,916,996 B2 * 7/2005 Kuan .................... H05K 1/0245
174/255

(Continued)

FOREIGN PATENT DOCUMENTS

FR 2963297 A1 2/2012
GB 2501330 A 10/2013
WO 2012016862 A1 2/2012

OTHER PUBLICATIONS

International Search Report dated Jan. 26, 2015 for corresponding International Application No. PCT/EP2014/072992, filed Oct. 27, 2014.

(Continued)

Primary Examiner — Jinhee Lee
Assistant Examiner — Ingrid Wright
(74) Attorney, Agent, or Firm — Im IP Law; C. Andrew Im

(57) ABSTRACT

A support is provided for attachment to an internal rear-view mirror made from plastic material or lightweight metal for a portable device having a telephone or GPS display screen or for generally electronic, electrical or other devices. The support includes a hooking member shaped to engage with another part of the rear-view mirror, the upper edge thereof, via two hooks, located to either side of a ball pin attaching the rear-view mirror to the windscreen. The hooking member is formed in part from a plurality of links articulated by hinges, in the manner of a metal watch strap. The hooking member is started by a hook-shaped link that secures to the upper edge of the rear-view mirror, followed by a series of links, varying in number, so as to match and constrain the shape of the rear-view mirror, and is finished by two leg feet that form a slide.

20 Claims, 4 Drawing Sheets

(51) Int. Cl.
*H02J 50/10* (2016.01)
*H02J 7/02* (2016.01)
*H02J 7/35* (2006.01)
*B60R 11/00* (2006.01)

(52) U.S. Cl.
CPC .............. *H02J 7/025* (2013.01); *H02J 7/355* (2013.01); *H02J 50/10* (2016.02); *B60R 2011/0033* (2013.01); *B60R 2011/0059* (2013.01); *B60R 2011/0071* (2013.01); *B60R 2011/0089* (2013.01); *B60R 2011/0294* (2013.01)

(58) Field of Classification Search
CPC ..... B60R 2011/0071; B60R 2011/0078; B60R 11/0229; B60R 11/0235; B60R 1/04; B60R 2011/0294; B60R 2011/0089; H02J 50/10; H02J 7/025; H02J 7/355
See application file for complete search history.

(56) References Cited

U.S. PATENT DOCUMENTS

| 2012/0080465 A1* | 4/2012 | Son | B60R 11/02 224/276 |
| 2012/0205412 A1* | 8/2012 | Choi | B60R 11/02 224/483 |

OTHER PUBLICATIONS

English Written Opinion dated Jan. 26, 2015 for corresponding International Application No. PCT/EP2014/072992, filed Oct. 27, 2014.

* cited by examiner

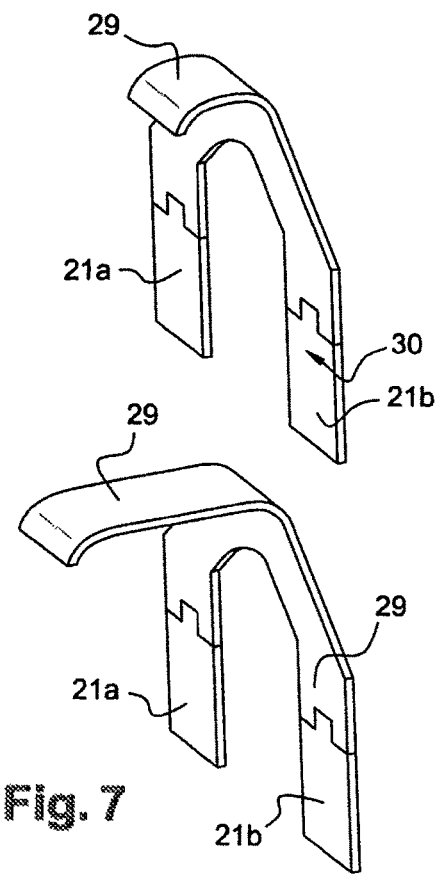
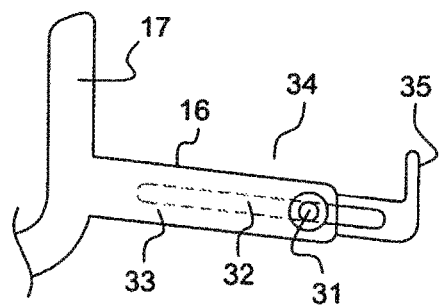
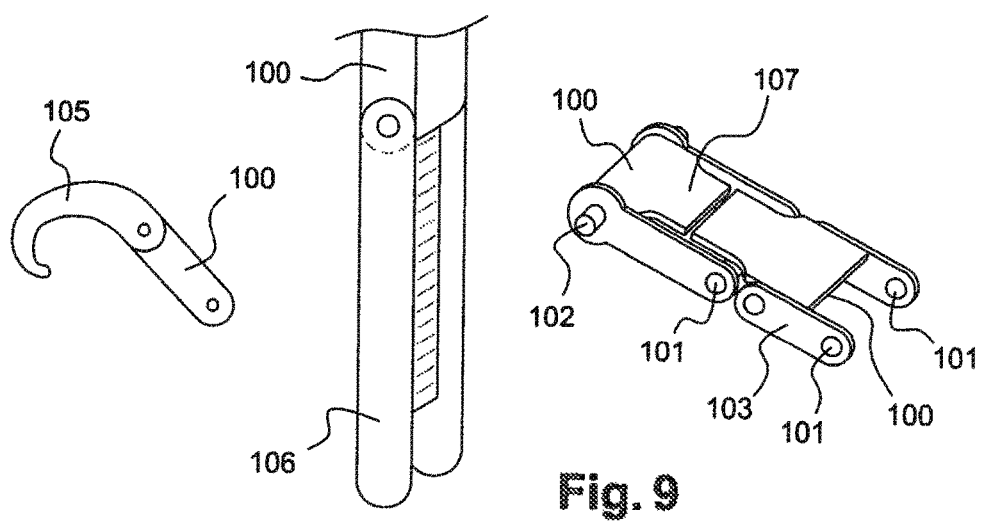

SUPPORT FOR ATTACHING A PORTABLE DEVICE TO A VEHICLE REAR-VIEW MIRROR

CROSS-REFERENCE TO RELATED APPLICATIONS

This Application is a Section 371 National Stage Application of International Application No. PCT/EP2014/072992, filed Oct. 27, 2014, the content of which is incorporated herein by reference in its entirety, and published as WO 2015/082132 A1 on Jun. 11, 2015, not in English.

FIELD OF THE DISCLOSURE

The present invention relates to a support for attaching a portable communications device or positioning device to the inside rear-view mirror of a vehicle, this portable device being provided with a display screen and operating commands, for example a cell-phone called a portable phone or a device providing assistance in the driving of a vehicle, called a GPS, and generally electrical or electronic devices, listed here below, that can be used by the driver.

BACKGROUND OF THE DISCLOSURE

There are fixtures for attaching such devices (called "portable" devices, mobile telephones or GPS devices) to the windshield or to the instrument panel by suction-cup systems or by hooking to the air vents or by hooking to the rear-view mirror.

Other supports have been proposed for affixing these portable devices to the inside rear-view mirror of a motor vehicle. These supports have several drawbacks.

A large proportion of these supports use a suction cup attached to the windshield or to the instrument panel. In the former case, they have the drawback of getting unstuck whenever there is a change of humidity or temperature in the vehicle.

The method of hooking these devices to the air vents has the drawback of not being easy to standardize.

The best known of these supports using suction cups or air vents have trade names such as Richter®, HR®, 30 Hama®, Tomtom®, Garmin® (registered trademarks).

There is a British patent, No. GB 2501330 "Hands-free cradle for smart phone, PDA, satellite navigation device", which also uses a suction cup.

There also exists an affixing support promoted by the commercial distribution firm (registered mark) PEARL, consisting of two parts, one part equipped with means for attachment to the rear-view mirror by means of a jaw fixed to the side of the rear-view mirror, adjusted along the width of the rear-view mirror while the other part is at the extremity of a "shower hose" that is relatively hard but deformable in order to be crimped at its end to a mobile device or to a GPS device. The drawback of this device, which has parallel jaws, is that the rear-view mirror can have non-parallel lower and upper edges, or domed edges, so much so that the jaws do not clamp in a stable way. Another drawback is that these jaws can clamp only on to the left-hand or right-hand side of the rear-view mirror and not in its middle so much so that the "shower hose" has to be oriented in order to act as a counterweight and any action applied manually to the mobile unit or to the GPS etc. causes imbalance to the rear-view mirror through the gripping of the jaws on the side. The mobile phone or the GPS device fixed to the extremity of the "shower hose" has another drawback of being anchored relatively solidly so much so that in the event of impact, this "shower hose" resists the impact and can cause injury.

SUMMARY

An exemplary embodiment of the invention relates to a support for a portable device, a display screen or any other of the devices listed here below, comprising a first extremity provided with a first means for affixing it to an inside rear-view mirror of a vehicle and a second extremity provided with a second means to receive and maintain said apparatuses and said communications or positioning devices such as the portable telephone and the GPS unit, and generally electronic or electrical devices usable by the driver, listed here below, whether they are oriented towards the driver or towards the windshield: a personal digital assistant (PDA), radar, hands-free kit, rear vision for blind spots, payment devices, Webcam®, WIFI®, RFID (registered mark), memory card support reader with or without processor, car-sharing meter, fuel tax software pack, for example for trucks, fleet-management software terminal, Bluetooth®, MP3®, computer, tablet, black box, vehicle-maintenance box, taxi meter, camera, image or video viewer, hologram system, parking assistance, parking search device, radar, reversing screen, information on parking time, automatic parking, projection on windshield, electronic toll collection transceiver, anti-collision transceiver, radio transceiver, night vision, rear vision for rear seats, television, driver sleep monitor, antenna support, transmitter for opening/closing garage door, laser transceiver, battery charger, signal lamp, ensign, projector, etc.

According to a first aspect of the invention, the first means comprises a rim support or cap to be applied against the lower edge of the rear-view mirror and a hooking element shaped to cooperate with another part of the rear-view mirror, the distance of which from the support or cap can be adjusted by at least one spring or hooks on the top of the rear-view mirror immobilized by screws to make sure, after mounting, that there is permanent and firm contact between the support or cap and the lower edge of the rear-view mirror.

Advantageously, the invention can have four other alternative embodiments which enable it to be adaptable on all currently commercially available rear-view mirrors.

In the first embodiment, the hooking element is a flat clamp positioned around the axis of the rear-view mirror on the windshield, each end of which forms a leg that constitutes a slide cooperating with two guideways or wells of the support perpendicular to the support. The immobilizing of the legs in the guideways or wells is caused by the tightening of the screws of the locking staple, with its two extremities and with spikes. The flat parts of these legs are embossed with spikes so that the two extremities of the staple thus embossed penetrate the plate, truly immobilizing said legs by their clamping. This embodiment has the advantage of being simple to use for rear-view mirrors having an uncovered rear-view mirror attachment pin.

In the second, third and fourth embodiments, the same disposition of the legs is applied, constituting a slide cooperating with two guideways or wells of the support perpendicular to the support. The immobilizing of the legs in the guideways or wells is prompted by the tightening of the screw of the locking staple with its two spike-shaped ends. The flat parts of the legs are embossed with spikes so that the two extremities of the staple which are also embossed, penetrating the plate through holes, placed in the middle of the guideways or wells, truly immobilize, through their clamping, said legs gripped in the guideways or spikes.

In the second embodiment especially, the clamp serves not to get hooked to the ball joint pin of the rear-view mirror which it circumvents, but as a hook on the upper rim of the rear-view mirror; thus, it has an L-shaped angle in its upper part and has a hook at the top of the rear-view mirror facing the lower support or cap to cooperate with the lower edge of the rear-view mirror. The invention provides for several dimensions of U-shaped clamps in their part acting as hooks on the edge of the rear-view mirror so as to adapt to any rear-view mirror. This embodiment has the advantage of being simple to serve a set of rear-view mirrors provided that there are several small arms of different dimensions with hooks to adapt to this set of rear-view mirrors.

In the third embodiment especially, the hooking element is formed by a set of two distinct L-shaped hooks, the greater leg of which forms said slide cooperating with the guideways or wells, the shortest leg of which faces the bottom support to cooperate with the upper edge of the rear-view mirror. This embodiment has the advantage of adapting to all the existing rear-view mirrors inasmuch as a set has rectangular several hooks, the small horizontal hooked arm which varies according to the thickness of the rear-view mirror. The feet of the large legs are provided with spikes so that the staple that clamps them in the well immobilizes them by stress.

In the fourth embodiment especially, the hooking element is formed by a set of two similar L-shaped hooks, the greatest leg of which forms said slide cooperating with the guideways or wells, and the length of which, both for the horizontal part on the top of the rear-view mirror and the vertical part on the back of the rear-view mirror, is constituted by successive hinged links, linking them to one another, like the generally metallic watch straps available in the market, except that while the present invention of the support for the attachment of a portable device to a vehicle rear-view mirror is made of plastic, these links are also made of plastic, with a coefficient of solidity that is possibly different, these links being connected together made by horizontal pins threaded into lateral hinge knuckles and in the middle of each of the links or alternatively by pegs in front of the links and holes behind the links, the first links being shaped like hooks on the upper rim of the rear-view mirror, a certain number of links forming the small side of L shape of the hook horizontally against the upper edge of the rear-view mirror, a certain number of links, one or two in general, forming the turning point of the angle formed by the horizontal and vertical sides of the rear-view mirror, the other links descending vertically along the rear of the rear-view mirror to terminate in the last link in being connected by a horizontal pin to the vertical part of a leg or in another way for example by a hook or a screw or pegs at the top of the legs, similarly to the legs described here above, in proportion to the perimeter on the upper horizontal side of the rear-view mirror, plus the vertical side of the rear-view mirror, this leg entering into the wells or guideways constituted in the first means, perpendicular to the support. The advantage of this embodiment is that the unit constituted by the links, the number of which is variable according to the assembly, very exactly matches the horizontal shape of the top rear-view mirror, its rounded form towards the rear side of the rear-view mirror and the rear, often domed shape of the rear-view mirror. The principle of tightening the legs of the hooks with links entering the wells is exactly the same, i.e. it is done by a tightening of the screws of the staple, stressing the ends of the staple against the spikes of these legs. The mobility of the links relative to one another and their number makes it possible to adapt to any shape of rear-view mirror. Preference is given to links of dimensions similar to those of watch straps. The links of the invention are made of plastic or metal. They could be made of rubber. The present patent application extends the concept of this second aspect by replacing the set of links with a single element consisting of a rubber band starting from the hook before the rear-view mirror up to the well. The links can be connected by different types of dowels such as conical dowels, elastic dowels, safety splints, helicoidally threaded dowels, etc.

As an alternative, the links each comprise, in the front, two pegs and in the rear two holes made out of fins of the link. Thus, a link can cooperate with a previous link and a following link, the link getting hooked to the previous link by means of its two pegs which get inserted into the holes of the previous link. Said link furthermore receives the following link by means of its two holes in which the two pegs of the following link get inserted.

The first link gets hooked to two holes of a hook-shaped link to get anchored to the top edge of the rear-view mirror. The two holes of the last link get fitted into the two pegs of the corresponding leg to be inserted into the corresponding well of the affixing piece.

According to a second aspect of the invention, the support has two parts, one bearing the first means and the other bearing the second means, these parts being mobile relative to each other through a deformable linking zone which makes it possible, when the support is fixed to the rear-view mirror, to obtain a play of the second part relative to the first part.

This deformable link makes it possible to modify the position of the portable apparatus or GPS or the devices listed here above relative to the rear-view mirror in order for example firstly to retract this portable apparatus, the mobile or the GPS or the devices listed here above in order to clear a lower cavity in the lower part of the first means of fixing to the rear-view mirror in order to make the day/night button of the rear-view mirror accessible. Furthermore, the utility of modifying the position of said devices makes it possible, in the event of impact during an accident, to prevent the portable device or the GPS or the other devices listed here above from getting inserted into the second means without escaping their support because they are solidly anchored to receive and hold said apparatuses and said devices.

With regard to this aspect of the support, a first embodiment of the deformable linking zone is in the form of an articulation hinge braked beneath the rear-view mirror. This articulation can have appreciably horizontal axis since it has a hinge or a ball joint. In a second embodiment, the deformable linking zone is formed by an aluminum or plastic deformable material. A third embodiment comprises a ball joint integrated into the body of the rear-view mirror setting up a link between the rear-view mirror and the extremity provided with a second means to receive and maintain said apparatuses and said communications devices or positioning devices beneath the rear-view mirror such as the portable telephone and the GPS unit and generally electronic or electrical devices which can be used by the driver, listed here above.

Other features and advantages of the invention shall appear from the following description given here below of examples of its embodiment.

BRIEF DESCRIPTION OF THE DRAWINGS

Reference will be made to the appended drawings, of which:

FIG. 7 illustrates a schematic view of a U-shaped clamp or U-shaped bracket comprising at least one hook to adapt to the top of the rear-view mirror, this hook possibly having its part perpendicular to the legs in different dimensions to adapt to different rear-view mirror thicknesses, and a hinge for each leg, FIG. 8 illustrates a schematic view of the support with rim or cap applied against the lower edge of the rear-view mirror, comprising a guideway retaining the bottom edge of the rear-view mirror, positioned by the screw and a button that is fixedly placed in an oblong aperture of said guideway, FIG. 9 illustrates a schematic view of the links each comprising, in front, two pegs and, in the rear, two holes made in the fins of the link. Thus, a link can cooperate with a previous link and a following link, the link getting hooked to the previous link by means of its two pegs which get inserted into the holes of the preceding link. The first link gets hooked to two holes of a hook-shaped link to get anchored to the top edge of the rear-view mirror. The two holes of the last link get fitted into the two pegs of the corresponding leg intended for insertion into the corresponding well of the attachment piece.

DETAILED DESCRIPTION OF THE INVENTION

Figure 1:
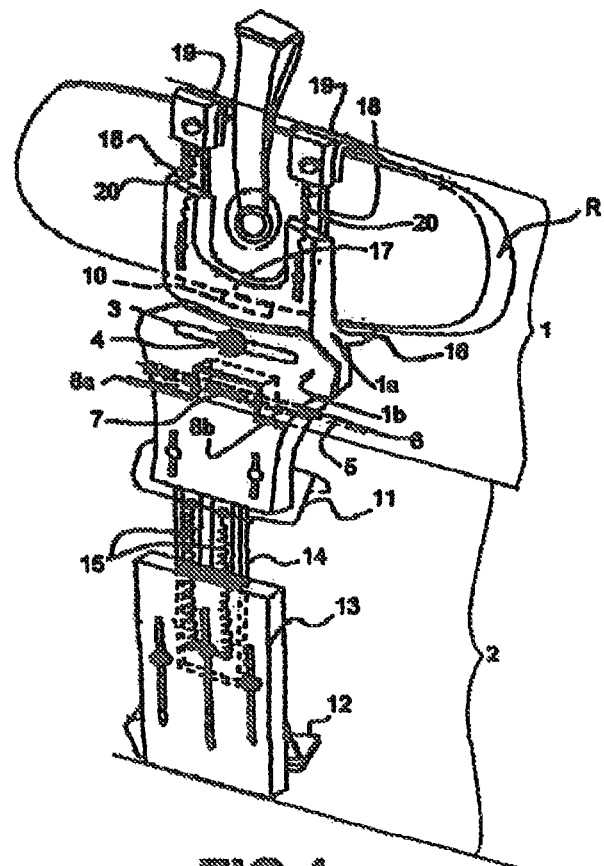
FIG. 1 illustrates a rear schematic view of the support according to the invention associated with an inside rear-view mirror of a vehicle, a view of the springs for holding the hooks on the top of the rear-view mirror and a schematic view of the oblong aperture which enables the first extremity, provided with a first means to affix it to an inside rear-view mirror of a vehicle, to be oriented relative to the second extremity provided with a second means to receive and maintain said apparatuses, as well as a schematic view of the three hinge knuckles used to connect the first means to the second means by enabling the second means to pivot backwards relative to the first means.

In FIG. 1, the support according to the invention is constituted by two parts.

Figure 3:
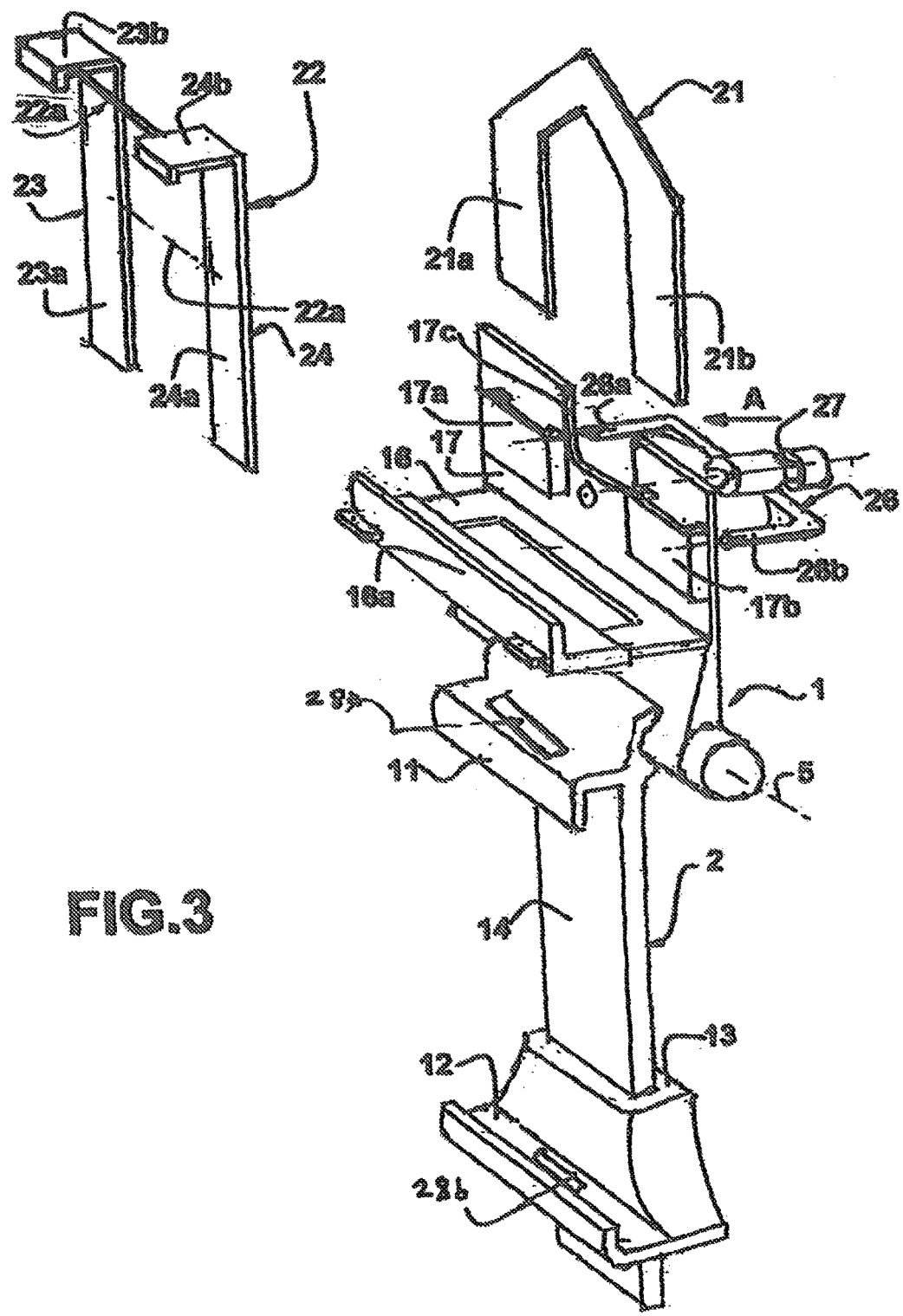
FIG. 3 illustrates a schematic view of the first aspect of the support of the invention, namely in one of its four alternative embodiments of the means for its affixing to the rear-view mirror, using a U-shaped clamp, hooked to the ball joint for attachment to the windshield, and a schematic view of the slide-ways or wells and of the staple constraining the vertical legs of the hooks for attachment to the top of the rear-view mirror, or the vertical legs of the U-shaped clamps resting on the pin of the ball joint for attachment of the rear-view mirror to the windshield.

The first part (1) comprises means to get fixed to the rear-view mirror (R) of the vehicle. These, means will be explained in greater detail with reference to FIG. 3.

The second part (2) comprises means to receive and maintain an apparatus such as a portable telephone or a navigation assistance device known as a GPS, each provided with a screen, in a known way, or the generally electronic or electrical devices listed here above, means which will be explained in greater detail with reference to FIGS. 1, 3, 5, 6, 7 and 8.

The two parts (1) and (2) can be indexed relative to each other around a substantially vertical axis when the support is fixed to the rear-view mirror. The means providing for this indexing are for example an oblong aperture (3) made in the element (1) crossed by a screw (4) implanted in the element (1). One of the elements (1) and (2) rests on the other by means of a cylindrical surface on the exterior or interior of the lower cap (1a) and this defines the vertical axis mentioned here above.

According to the invention, in the representation of FIG. 1, the two parts (1) and (2) are connected to each other by an articulation having a substantially horizontal axis (5). This articulation has a hinge-pin (6) which passes through a hinge knuckle (7) of the element (1) and two hinge knuckles (8a and 8b) of the part (2).

This articulation is braked by any known means (not shown). One means can be a notching between the hinge knuckles, these hinge knuckles being relatively compliant if they are not made out of plastic. This enables an indexing of the parts (1) and (2) around the axis (5) in various discrete positions. Another possibility of braking this hinge consists for example in providing for a hinge-pin (6) mounted fixedly in rotation in the hinge knuckle (7) and elastomer bearings within the hinge knuckles (8a or 8b). A nut at each threaded end of the hinge-pin (6) crushes each bearing by making it swell radially to create a calibrated friction. Other solutions within the scope of those skilled in the art can be implemented.

Figure 6:
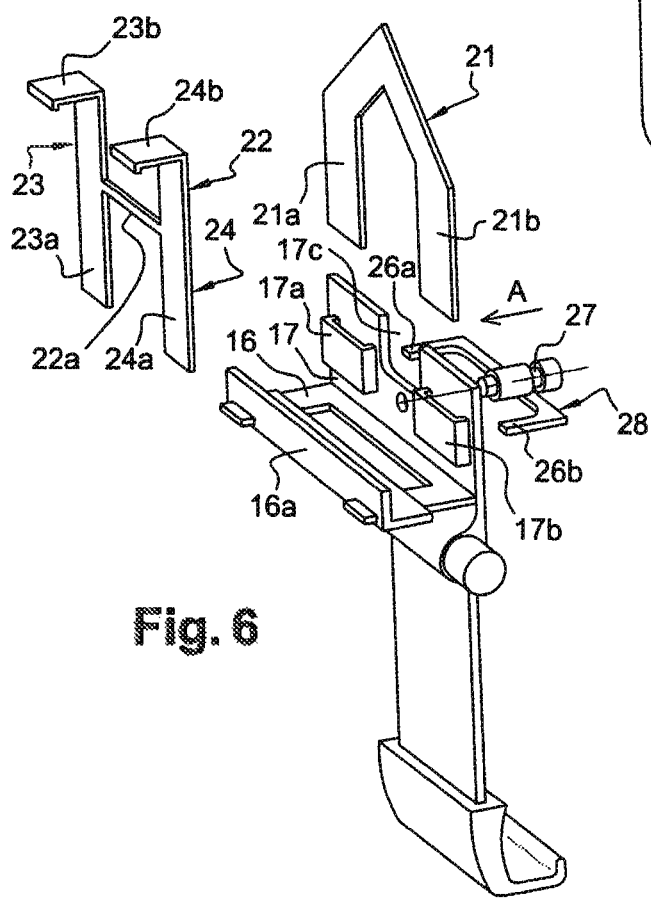
FIG. 6 illustrates a schematic view of the first means for affixing the rear-view mirror, the support of the mobile or of the GPS unit or of the electronic or other devices being oriented towards the windshield.

The articulation having the axis (5) also enables the part (2) to be turned around in the reverse sense, i.e. by 180° (FIG. 6, i.e. towards the windshield (instead of towards the driver)), to receive and maintain the devices mentioned further above, such as a radar, an electronic toll collection transceiver, an anti-collision transceiver, a projector, etc. towards the windshield, thus constituting a second use. The screens and the devices listed here above also be oriented either towards the driver or towards the passenger of the vehicle.

Figure 2:
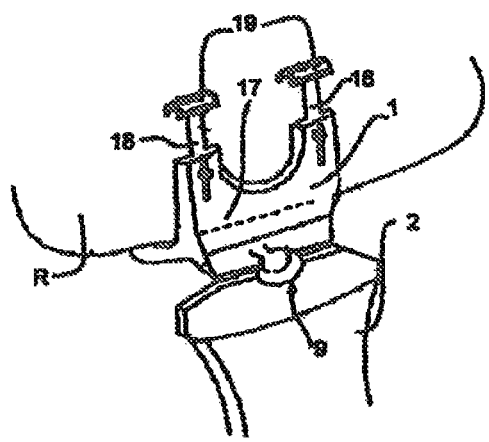
FIG. 2 illustrates a schematic view with a ball joint of an alternative embodiment of the support of FIG. 1, used instead of the three hinge knuckles.

This mobility between the rear-view mirror and the apparatus with screen and said devices can, in one alternative embodiment, be provided by a ball joint articulation (9) as illustrated in FIG. 2 or by turning the hinge knuckles (8a and 8b) illustrated in FIG. 6 around by 180° relative to the central hinge knuckle (7). This figure shows some of the elements already described with the same references.

The tightening of the articulation for its part is ensured by any known means. It is possible for example to carry out an adjustment of the ball joint by force in its housing, or else by a cone-point set screw between the casing of the ball joint and the sphere accessible from the outside. It can also be a sort of tangent screw which, depending on its position, brakes the rotation of the sphere in its housing.

The possible movement between the parts (1) and (2) of the support according to the invention will have a preferred direction towards the windshield in the first use this support for holding mobile telephones or GPS units. Thus, the driver can push the part (2) towards the windshield in order for example to increase his field of view, the part (2) of the support, for example with its GPS navigation screen, being housed behind the rear-view mirror.

This movement has a releasing effect or clearing effect (not shown) which also provides access to the day/night selector switch (10) of the rear-view mirror when it exists. To this end, the means (1) have a large notching or access space providing access to the day/night button.

The arrangements of articulation devices described here above are not exhaustive. It would not be a departure from the framework of the invention to provide for an element in which the parts (1) and (2) are connected by a material such as an aluminum rod or a rod with plastic deformation making the articulation flexible, capable of getting bent and/or twisted under the effect of a determined force and preserving its final state so long as another force is not imposed by another geometry. Such materials can associate a variable geometry framework associated with a component organizing around or in said framework, a braking of one of its degrees of freedom.

Similarly, the ball joint device can be designed to rotate freely on 180° so as to make use of the part (2) in order to keep a generally electronic or electrical device mentioned here above such as a radar, an electronic toll collection device, a projector, etc. in the direction followed by the vehicle.

FIG. 1 illustrates an embodiment of the parts (1) and (2) and of the means that each of them comprises in order firstly to cooperate with the rear-view mirror (R) and secondly receive and maintain the detachable apparatus with screen or electronic or electrical device mentioned here above.

As regards the holding of this apparatus, the part (2) of the support according to the invention comprises two supports with rims or two caps (11) and (12) facing each other between which the detachable apparatus or above-mentioned electronic or electrical device is inserted.

The cap (11) belongs fixedly or adjustably as can be seen in FIG. 1 to the part (2). The cap (12) is carried by a support plate (13) which is mounted slidingly on slides (14) of the part (2). One of the springs (15) is stretched between the two caps (11) and (12), the low point of the spring being fixed to the cap (12), this cap being mobile by sliding on the support (14) or between the mobile low cap (12) and a fixed but adjustable point situated in the body (2) at the other top end of the spring or springs, the effect of which is to bring the two caps close to each other to grip the detachable apparatus or the above-mentioned electronic or electrical device that they must hold. The top fixed point of said spring in the body (2) can be transferred from top to bottom in the oblong aperture or channel made in the part (14) (FIG. 1); it is used to clamp the apparatus to the screen or the above-mentioned devices according to their height. The tension of this spring or these springs is thus adjustable so as to exert a sufficient clamping force through equal tension of the spring or springs, so as not to exert excess fatigue stress on them whatever the dimensions of the apparatus or of said device or devices.

As regards the fixed attachment to the rear-view mirror (R), the part (1) comprises a low hook or fixed support or cap (16) in order to be supported on the lower edge of the rear-view mirror. This fixed support, the length of which is variable according to FIG. 8, is perpendicular to the walls of the plate (17) with a notching to be able go around the attachment of the rear-view mirror to the windshield which also comprises guideways for the slides (18) terminated by hooks (19) which face the hook also called a support or cap (16). Springs (20) stretch to bring the hooks (19) close to the cap (16). As described here above, the tension of the holding springs (20) on the top of the rear-view mirror is adjustable. Thus, the support according to the invention can be adapted to all rear-view mirrors, including those that are supported by a rear arm of the ball joint at the windshield fixed to the upper edge of the rear-view mirror.

These constructional arrangements are given only on a non-exhaustive basis.

It is thus that FIG. 9 illustrates a preferred means, of a metal watch strap type, each comprising two pegs (102) in front and two holes in the rear (101) made in the fins of the link (103), the first link of the chain of links having the shape of a hook (105) to get anchored on the top edge of the rear-view mirror, the last link cooperating with a leg (106) intended to be inserted into the corresponding well.

Figure 5:
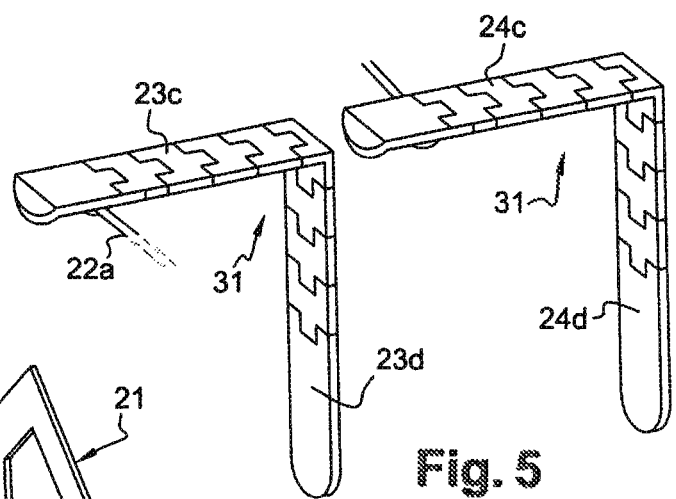
FIG. 5 illustrates a schematic view of hooks constituted by a flexible part made of successive links connected by horizontal pins threaded into the lateral and middle hinge knuckles, the first link being hook shaped on the top rim of the rear-view mirror, the last link being hooked to the part of the leg of this hook formed by two parts, a flexible part and a rigid part, entering the guideways or wells, the mobility of the links between themselves being adapted to every shape of rear-view mirror.

FIG. 5 illustrates alternative means constituted by successive links (23c, 24c) of a metal watch strap type, matching all the shapes of the rear-view mirror in order to be affixed to the rear-view mirror (R) of a vehicle. This FIG. 1a shows most of the elements and units described here above, the last link being fixed to the leg of this attachment piece (23b, 24b) penetrating the guideways or wells (17a, 17b) of the plate (17).

The guideways or wells of the plate (17) are referenced (17a, 17b) and are oriented perpendicularly to the support also called a cap (16) perpendicular to the plate (17), which constitutes the bottom fixed hook described here above. The arms (34) comprise a guideway with a rim for holding the rear-view mirror (16a or 35) which enables distance from this rim to the plate (17) to be made to vary. This distance can be adjustable by means of oblong apertures (32) and is fixed by screws and buttons (31) immobilizing the oblong apertures (32) so as to obtain forward or backward movement by means of the oblong apertures, then fixing the rim (16a) or (35) at the right distance to take account of several thicknesses of rear-view mirrors.

A notching (17c) enables the housing of the attachment piece for attaching the rear-view mirror to the windshield of the vehicle.

The affixing of the rear-view mirror is done through seven different means depending on the nature of the rear-view mirror encountered, and the user's choice.

The first of these means (FIG. 1) is constituted by hooks (19) connected by springs (18) to fixed points of the part (17) enabling these hooks to slide in the part (17) to hold the top of the rear-view mirror in applying constraint on the lower cap (16).

The second of these means (FIG. 2) is constituted by a ball joint of the part (17) getting inserted into the part (2).

Figure 4:
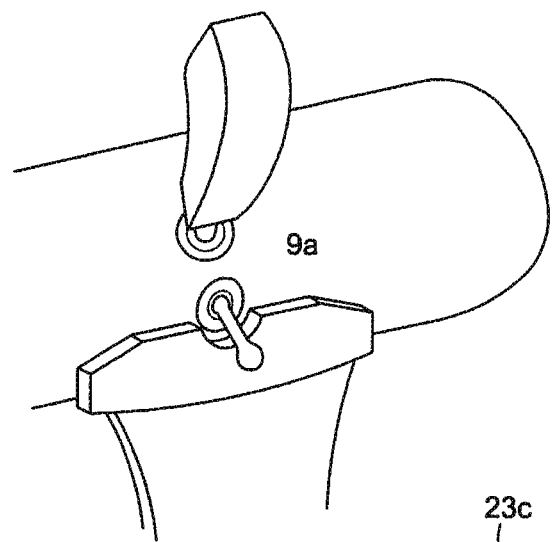
FIG. 4 illustrates a schematic view with a ball joint integrated into the rear-view mirror.

The third of these means (FIG. 4) is constituted by a ball joint (9a) integrated into the rear-view mirror (R) with an arm of this ball joint to suspend the part (2) of the invention.

The fourth of these means (FIG. 3) is constituted by a bracket (21) which has two legs (21a and 21b) that form the slide which can be slid in the guideways or wells (17a and 17b). The bottom of the bracket which passes behind the rear-view mirror is thus suspended and secured to the pin of the ball joint of the fixed attachment of this ball joint to the windshield, in proximity to the rear wall of the rear-view mirror. The bracket (21) can be articulated by two hinges (30). Different types of hooks (29) of the bracket exist according to the length of their horizontal arms to adapt to rear-view mirrors of different thicknesses or by the length of their vertical arms to adapt to the height of the pin of the ball joint of the attachment piece for attaching the rear-view mirror to the windshield relative to the bottom of the rear-view mirror.

The fifth of these means (FIG. 7) is constituted by a bracket (21b) forming an angle relative to the legs and hooks of a type (23 and 24), (21a, 21b) which form the slide, to be slid in the guideways or wells (17a, 25 and 7b) to get anchored to the top edge of the rear-view mirror. Several dimensions are provided for the horizontal part of the bracket and hooks centered (29) or in two parts (not shown) to go around the attachment of the rear-view mirror to the windshield, i.e. therefore a set of angle brackets.

The sixth of these means (FIG. 3 to the left) is constituted by a set of angle hooks to adapt to different thicknesses of rear-view mirrors. The set (22) of two hooks (23 and 24) is possibly linked by a dismountable cross member (22a). Each hook is therefore L-shaped with one long arm (23a, 24a) which forms the slide to be housed in the corresponding guideway (17a, 17b) and a short arm (23b, 24b) of a variable length corresponding to the thickness of the rear-view mirrors which cap the upper edge of the rear-view mirror such as the hooks (19) of the preceding figures.

Since the legs of each hook or bracket are constituted by a flat part (23a, 24a, 21, 21b and 106) with two hollow U-shaped rims or walls (not shown), they tend the legs which penetrate the guideways or wells (17a, 17b) more solid. These guideways or wells (17a, 17b) themselves comprise rectangular protrusions within (not shown) forming a U-shaped wall with a parallelepiped-shaped projection into the guideways or wells adapting to the U-shaped hollow of the legs formed by their flat part and their walls, thus contributing to the immobilization prompted by the tightening of the screw (27) of the locking staple 26. The flat parts of these legs are embossed with spikes so that the two extremities of the staple are embossed, penetrating the plate (17), properly immobilizing said legs by their gripping action.

Should the rear-view mirror comprise a ball joint pin and a link to the windshield or to the roof of the vehicle situated on the upper edge of the rear-view mirror, the hooks (22 and 23) are shaped in their part (23b and 24b) to match this pin by a circumvention or a link (22a) between the parts (23b and 24b) so as to surround and solidify the foot of the ball joint pin. This is also the case for the L-shaped angle bracket (29) which can go around the attachment of the rear-view mirror to the windshield by a notching or two parts (not shown) in the horizontal part (29).

The bracket and the hooks are held in the guideways by a locking staple (26) the arms (26a, 26b) of which, through the handling of a screw (27) are brought towards or moved away from the slides housed in the guideways through the plate (17) so as to grip them into these guideways or release them. The staple (26) is unique. It is thus possible to lock the arms (26a and 26b) of the staple (26) by means of the clamping screw (27) penetrating by screwing into the plate (17), against the legs (21a and 21b) of the bracket (21), or of the bracket to at least one of the two hooks (29) or on the vertical legs of the hooks (22 and 23) or the legs (23d, 24d) connected to links thus immobilizing the rear-view mirror whatever its shape, in also moving away or bringing closer the support or cap (16) relatively to the lower edge of the rear-view mirror and maintaining firm contact between this support or cap and the lower edge of the rear-view mirror when the staple (26) is tightened and acts by its arms (26a and 26b) in contact with the feet (21a, 21b, 23a, 24a, 23d, 24d) in contact with the legs of the bracket or of the hooks, these legs being provided with uneven surfaces.

The surfaces of the supports (11, 12 and 16), the walls (17a and 17b) of the part (17), a part of the brackets (21) and hooks (22 and 23) comprise bondings of rubber or foam to prevent sliding motions.

The seventh of these means (not shown) is constituted by a magnet fixed to the support (14), the GPS or the telephone having received a magnetizable pad or a pad having available a metallic part glued to the back of the portable apparatus.

The eighth of these means (FIG. 5) which are the preferred means of the invention are constituted by a hooking element formed by a set of two similar L-shaped hooks, the greatest leg of which forms said slide cooperating with the guideways or wells, the length both of the horizontal part at the top of the rear-view mirror and of the vertical part on the back of the rear-view mirror being constituted by successive hinged links made of plastic with a high coefficient of solidity or of a similar material, linking them to one other as in the case of commercially available, generally metallic watch straps, these links being connected by horizontal pins threaded into the hinge knuckles of each of the links, the first link being hook-shaped on the upper rim of the rear-view mirror, the last link being linked to a leg forming a slide in the guideways or wells of the plate (17).

As an alternative, as illustrated in FIG. 9, the links 100 each comprise two pegs 102 in front and two holes 101 in the rear made in fins 103 of the link. Thus, a link 100 can cooperate with a previous link 100 and a following link 100, the link 100 being hooked to the previous link by means of its two pegs 102 which get inserted into the holes 101 of the previous link. Said link 100 furthermore receives the following link by means of its two holes 101 in which the two pegs 102 of the following link get inserted.

The diameter of the pegs 102 and their height is substantially identical to the diameter of the holes 101 depending on the thickness of the fins 103 of the link 100. The pegs 102 are made in one piece with the link 100, i.e. the pegs 102 and the corresponding link 100 form one and the same part. The fins 103 which are configured flexibly can be spread apart by elastic deformation to adapt to the entry of the pegs 102 or to their exit. Thus, the insertion or withdrawal of the links 100 can easily be done by hand and provide for a variable length of the chain of links 100.

The first link 100 is hooked to the two holes 101 of a hook-shaped link 105 to get anchored to the upper edge of the rear-view mirror. The two holes 101 of the last link 100 are fitted into the two pegs 102 of the corresponding leg 106 that is to be inserted into the corresponding well of the attachment element.

Preferably, each link 100 also comprises a tongue 107 to conceal the space existing between the two fins 103.

It will be noted that the parts constituted by these link means comprise only three parts to be manufactured: these are the first link with a hook, the leg forming a slide in the guideways or wells and a repetitive number of identical links in the middle of these two ends which requires only one injection mould. The cost price of this version of hooks is therefore very low.

It will be noted that these plastic links can be replaced by rubber links and that these link means can be replaced by a rubber band starting from the hook in front of the rear-view mirror up to the well.

It will be noted that these links are either connected to one another by dowels of different types, conical dowels, elastic dowels, safety splints, helicoidally threaded dowels, etc. or linked to each other by the fact that they comprise pins and holes for each link in order to get anchored to each other or detached from each other.

The matching to rear-view mirrors of different sizes is obtained by the removal or addition of one link or two links or three links.

This remarkable advantage of these two versions using hooks with links is that it can be adapted to any rear-view mirror whatever its thickness and shape in additionally matching the totality of its configuration, from the upper part above the rear-view mirror glass and the rear part of the rear-view mirror. This truly universal version complies with the best technical approach and the best cost price.

It will be noted that one major arrangement of the invention is that the assembly for holding the attachment piece to the rear-view mirror is appreciably centered, whatever the modes of attachment (spring hooks, brackets with legs, angle brackets and legs with hooks or hooks formed by watch strap links) and circumvents the ball joint pin from the rear-view mirror to the windshield, and that therefore the support of the telephone or the GPS unit or said electronic or electrical devices does not disturb the positioning of the rear-view mirror in its rear-view function.

It will also be noted that the characteristic of the folding of the lower part for holding the telephone and the GPS unit or said above-mentioned devices beneath the rear-view mirror in the event of impact is a very major safety factor.

Thus, it will be understood that if the support according to the invention is presented when it is sold for example with a set of brackets (21) and/or a set of angle bracket and hooks (21*b*) and/or a set (22) of hooks (23), (24) different from one another by the length of their small arm and/or hooks with links (31) of FIG. 5 and 100, 101 of FIG. 9 of a watch strap type very perfectly matching the shape of all the rear-view mirrors, the purchaser is offered the possibility of positioning the support on the great majority if not all existing rear-view mirrors.

It will be noted that in one embodiment, it is the part (2) of the support formed by two elements (11) and (12) that are indexed relatively to each other around a substantially vertical axis of the support (14). These elements (11) and (12) can be pierced (28*a*, 28*b*) to enable the positioning of connection cables between the telephone or the GPS device or between the above-mentioned devices and the solar battery or the charger, this charger being held behind the telephone or the GPS device or any other above-mentioned device by self-adhesive textile clamping or any other means.

It will be noted, finally, that in the variant in which the second means is turned around by 180° towards the windshield, the application of the attachment piece is extended to maintaining an anti-fog radar or a electronic toll collection transceiver or an anti-collision transceiver or a sleep detector or a night-vision apparatus or a projector, etc.

The present support for attaching a portable device to a rear-view mirror of a vehicle can be manufactured on an industrial scale at a price that is competitive with existing attachment pieces but has special features possessed by none of these attachment pieces. These features are that the present support is adapted to all sizes of GPS units and all dimensions of the rear-view mirror, or of mobile telephones, even those provided with Bluetooth®, devices that drivers always keep with them because they provide a permanent link with their workplace and families; the present support is a visible and audible solution ideal for GPS and for mobile telephones which are often left in the driver's pocket, on the seat beside him or her, on the car floor or in a bag, which is detrimental to safety; if there is an accident, it gets folded beneath the rear-view mirror so as not to hit the driver's forehead; in getting folded, the extremity of its support does not touch the windshield of a motor vehicle, whether big or small; it does not obstruct the front view of the road to be followed, being attached to a high point, that of the fixed rear-view mirror at the top of the windshield; it makes it easy for the driver to adjust the day/night button by hand because of its position close to the driver; nor is it in the field of explosion of the airbags which avoid the rear-view mirrors in the same protected axis; it is close to the part of the windshield that is transparent to telephone or GPS transmissions, improving their reception; it is fixedly attached, on the contrary, to the suction cups or air vents; it proposes different modes of attachment to the rear-view mirror making it possible to respond to all categories, sizes or shapes of rear-view mirrors; the supporting foot of the second means carrying the mobile telephone or the GPS or other electronic or electrical apparatuses can be planned in such a way as to vertically receive the biggest mobile telephones owing to the great size of the base of the support, namely the Samsung Note 2 (registered mark), with a height of 15 cm, because of its small base size, in another version of the support, it can be designed to enable insertion of any GPS unit or any mobile telephone horizontally; since it is close to the rear-view mirror, the attachment piece reduces the driver's points of attention from three points to two points. These two points of attention are the road and the pair constituted by the screen and the rear-view mirror, instead of the three points which are the road to be followed, the action to be performed on the screen and the rear-view mirror. This means that the driver will no longer make any lurching movements. While driving, the driver is informed without moving his head. He moves only his eyes on the road to be followed if he is using the GPS function and he sees vehicles that are behind him or overtaking him at the same time; since he has a solar battery or another battery, the cigar-lighter cable, usually a nuisance for common attachment apparatuses, is eliminated. The invention enables easy listening to messages and good vision of instructions which are closer to the driver's eyes and ears than an apparatus attached to the windshield which is more distant. The second attachment means for attaching the mobile telephone or the GPS or generally electronic or electrical devices can be turned around by 180° on its substantially horizontal axis constituting a reversible hinge so that these devices face the windshield, thus very extensively increasing its applications as stated here above, for example by the insertion of an anti-fog radar.

The attachment piece is so to speak universal, provides safety and has numerous applications in the vehicle cabin.

An exemplary aspect of the present disclosure enables a affixing of the support, made of plastic with a high solidity coefficient or of light metal, to any type of rear-view mirror, along with means for maintaining mobile units or GPS units and many other devices of all dimensions, as well as for holding a solar battery or a charger, or contact battery or induction battery, behind and against the telephone or GPS etc., the space required for these elements, telephone or GPS unit or battery, being provided in the width of rim supports or top and bottom caps of the support for attaching the telephone and GPS units as to no longer relate the electrical operation of these devices to a power supply lead generally powered from the cigar-lighter unit.

Although the present disclosure has been described with reference to one or more examples, workers skilled in the art will recognize that changes may be made in form and detail without departing from the scope of the disclosure and/or the appended claims.

The invention claimed is:

1. A support for a portable apparatus possessing a telephone or GPS display screen for attachment to an inside rear-view mirror of a vehicle, the support being made of plastic or lightweight metal, the support comprising:
a first part provided with a first element to affix the support to the rear-view mirror, the first element comprising a cap with a rim to be applied against a lower edge of the rear-view mirror;
a second part provided with a second element to receive and maintain the portable apparatus beneath the rear-view mirror so as to be centered relative to the rear-view mirror;
wherein the cap comprises at least one guideway/well, and a hooking element shaped to cooperate with an upper edge of the rear-view mirror by two hooks situated on either side of a ball joint pin of the rear-view mirror, the hooking element is constituted partly by links articulated by hinges of a metal watch strap type, a first end of the hooking element is a hook-shaped link to anchor the hooking element to the upper edge of the rear-view mirror, a second end of the hooking element is two leg feet, each constituting a slide, and a varying number of links in succession to match a shape of the rear-view mirror joins the first and second ends of the hooking element, the slides are configured to be housed in guideways/wells constituted in the first element,
a locking element comprising two arms and a clamping screw introducing the two arms into holes provided in the first element to immobilize the slides in the guideways/wells, a distance from the upper edge of the rear-view mirror to the cap is adjustable by the leg feet penetrating into the guideways/wells, in a direction perpendicular to the cap, to ensure a permanent contact of the cap with the lower edge of the rear-view mirror, thereby immobilizing the rear-view mirror between the hooks and the cap.

2. The support according to claim 1, wherein the hooking element is a flat strap or U-shaped clamp, each extremity of the hooking element forms a leg.

3. The support according to claim 1, wherein the hooking element is an L-shaped bracket or hook with a central hook or two hooks on either side of an attachment of the rear-view mirror to a windshield of the vehicle, each extremity of the hooking element forms a leg.

4. The support according to claim 3, wherein the L-shaped bracket or hook is articulated by hinges.

5. The support according to claim 1, wherein the hooking element comprises L-shaped hooks corresponding to a thickness and a height of the rear-view mirror, a small arm of the L-shaped hooks is anchored by a hook on the upper edge of the rear-view mirror, and a large arm of the L-shaped hook comprises legs that constitute the slides housed in the guideways/wells by the locking element.

6. The support according to claim 1, wherein the hooking element is a set of L-shaped hooks, a small arm of each L-shaped hooks is anchored by hooks on the upper edge of the rear-view mirror, and a large arm of said each L-shaped hooks comprises legs hooked to springs connected to fixed or adjustable points of the first element.

7. The support according to claim 1, wherein the first and second parts are mobile relative to one another through a deformable linking zone, the support is mountable on the rear-view mirror by an articulation following a substantially horizontal axis between the first element and the second element, and the second part is movable towards a front of the vehicle relative to the first part.

8. The support according to claim 7, wherein the deformable linking zone along the horizontal axis comprises an articulation braked beneath the rear-view mirror.

9. The support according to claim 7, wherein the second element is movable towards a day/night button of the rear-view mirror by the articulation; and wherein the first element comprises a notch or space to access to the day/night button.

10. The support according to claim 7, wherein the articulation is a ball joint.

11. The support according to claim 7, wherein the articulation of the second part provided with the second element to receive the portable apparatus beneath the rear-view mirror comprises an articulation with ball joint integrated into the body of the rear-view mirror.

12. The support according claim 1, wherein the first and second parts are indexed relative to each other around a substantially vertical axis by an oblong aperture in the second part crossed by a screw implanted in the first part to adjust an orientation of the support.

13. The support according to claim 1, further comprising a reversible hinge to provide an articulation along a substantially horizontal axis between the first part and the second part, thereby enabling the second part or the second element to be turned around 180° such that the second part is oriented in a direction of a windshield of the vehicle.

14. The support according to claim 1, wherein the second part comprises a solar battery, a solar charger, a contact battery or induction battery to power the portable apparatus mounted in the support.

15. The support according to claim 1, wherein the rim of the cap on which the rear-view mirror rests is adjustable relative to the first element by guideways constituted in the cap of the first element, braked and immobilized by screws sliding in oblong apertures situated in the cap and tightening buttons to tighten the rim to the rear-view mirror.

16. The support according to claim 1, wherein the first part and the second part are connected by an element made of a material such as an aluminum rod or a material with plastic deformation making the articulation flexible and capable of getting bent and/or twisted under the effect of a determined force and preserving its final state so long as another force is not imposed by another geometry.

17. The support according to claim 1, wherein the second part comprises a magnet to mate with the portable apparatus comprising a magnetizable pad or a metallic part.

18. The support according to claim 1, wherein the links are made of plastic or rubber.

19. The support according to claim 1, further comprising two holes in fins of the links, a first link having a hook shape to anchor the first link on the upper edge of the rear-view mirror, a last link cooperating with a leg foot to be inserted in a corresponding guideway/well.

20. The support according to claim 19, wherein the links are connected to each other by dowels.

* * * * *